US 6,661,590 B2

(12) United States Patent
Cyrusian et al.

(10) Patent No.: US 6,661,590 B2
(45) Date of Patent: Dec. 9, 2003

(54) EFFICIENT ANALOG FRONT END FOR A READ/WRITE CHANNEL OF A HARD DISK DRIVE RUNNING FROM A HIGHLY REGULATED POWER SUPPLY

(75) Inventors: Sasan Cyrusian, Scotts Valley, CA (US); Stephen J. Franck, Felton, CA (US); Sriharsha Annadore, Santa Cruz, CA (US); Elmar Bach, Santa Cruz, CA (US); Siegfried Hart, Santa Cruz, CA (US); Thomas Blon, Santa Cruz, CA (US); William G. Bliss, Thornton, CO (US); James Wilson Rae, Rochester, MN (US); Michael Ruegg, Santa Cruz, CA (US); Ulrich Huewels, Santa Cruz, CA (US); Fritz Mistlberger, Sudmahrerweg 1 (DE)

(73) Assignee: Infineon Technologies AG, Munich (DE)

( * ) Notice: Subject to any disclaimer, the term of this patent is extended or adjusted under 35 U.S.C. 154(b) by 170 days.

(21) Appl. No.: 09/865,860

(22) Filed: May 25, 2001

(65) Prior Publication Data

US 2002/0176186 A1 Nov. 28, 2002

(51) Int. Cl.[7] .................................. G11B 5/09
(52) U.S. Cl. ........................ 360/32; 360/51; 360/66
(58) Field of Search ........................ 360/32, 51, 46, 360/67, 65, 66; 341/126, 155

(56) References Cited

U.S. PATENT DOCUMENTS

| | | | | |
|---|---|---|---|---|
| 5,862,007 A | * | 1/1999 | Pham et al. | 360/65 |
| 6,069,866 A | * | 5/2000 | Pietruszynski | 330/254 |
| 6,141,169 A | * | 10/2000 | Pietruszynski | 360/67 |
| 6,148,431 A | | 11/2000 | Lee et al. | |
| 6,199,191 B1 | | 3/2001 | Iwata | |
| 6,219,387 B1 | | 4/2001 | Glover | |

OTHER PUBLICATIONS

"Exact Bounds for Viterbi Detector Path Metric Differences," Paul H. Siegel, C. Bernard Shung, Thomas D. Howell, Hermant K. Thapar, IBM Corporation, San Jose, CA.

"A 100MBIT/S Viterbi Decoder Chip: Novel Architecture and its Realization," Gerhard Fettweis, Heinrich Meyr, ICC'90, paper No. 257, session 307A, Atlanta, GA, USA, Apr. 16–19, 1990.

"Where do we use Viterbi Decoder?" Opencores.org.

"A Tutorial on Convolutional Coding with Viterbi Decoding," Chip Fleming, Spectrum Applications, 1999, http://pw1.netcom.com/~chip.f/viterbi/tutorial.html.

"PRML: Seagate Uses Space Age Technology Today," http://www.seagate.com/support/kb/disc/prml.html.

(List continued on next page.)

Primary Examiner—Alan T. Faber
(74) Attorney, Agent, or Firm—Brinks Hofer Gilson & Lione

(57) ABSTRACT

A method and apparatus for running an analog portion (162) of a read/write channel (108) from a highly regulated power supply (260). The apparatus includes an analog portion (162), a clock synthesizer (154), and a highly regulated power supply (260) connected to the analog portion (162) and the clock synthesizer (154). The analog portion (162) and the clock synthesizer (154) both comprise high voltage transistors which operate in a first voltage range and low voltage transistors which operate in a second voltage range, wherein the first voltage range is within the second voltage range. The highly regulated power supply (260) supplies power that is within the first voltage range to the analog portion (162) and the clock synthesizer (154). The method includes generating power that is within the first voltage range using the highly regulated power supply (260), and supplying the power to the analog portion (162) and the clock synthesizer (154).

24 Claims, 3 Drawing Sheets

OTHER PUBLICATIONS

"PRML," http://www.idema.org/about/industry/ind_tech_prml.html.

"Hard Disc Data Encoding and Decoding," http://www.storagereview.com/guide2000/ref/hdd/geom/data.html.

"Technical Requirments for Encoding and Decoding," http://www.storagereview.com/guide2000/ref/hdd/geom/dataRequirements.html.

"Run Length Limited (RLL)," http://www.storagereview.com/guide2000/ref/hdd/geom/dataRLL.html.

"Partial Response, Maximum Likelihood (PRML)," http://www.storagereview.com/guide2000/ref/hdd/geom/dataPRML.html.

"Extended PRML (EPRML)," http://www.storagereview.com/guide2000/ref/hdd/geom/dataEPRML.html.

"MR and PRML: Technologies in Synergy—How Advanced Head and Read Channel Technologies Work Together to Increase Capacity and Improve Performace of Desktop Drives—A Quantum White Paper," http://www.lionsgate.com/Home/baden/public_html_index/SCSI/Quantum_White_Papers/MR_Head/MR4/9/01.

"Western Digital Corporation—Glossary, Viterbi Detection," http://www.westerndigital.com/company/glossary.html.

"Description of the Algorithms (Part 1)," http://pw1.netcom.com/~chip.f/viterbi/algrthms.html.

"Synchronous Recording Channels—PRML," KnowledgeTek, Inc., 1999.

"A CMOS Continuous–Time Gm–C Filter for PRML Read Channel Applications at 150 Mb/s and Beyond," Iuri Mehr, David R. Welland, IEEE Journal of Solid State Circuits, vol. 32, No. 4, Apr. 1997.

* cited by examiner

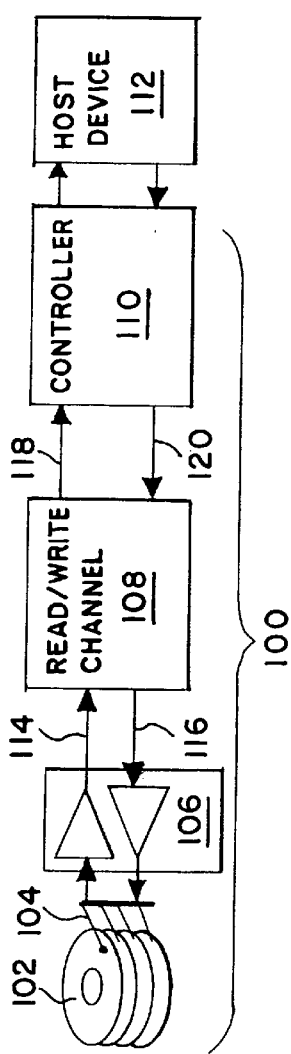
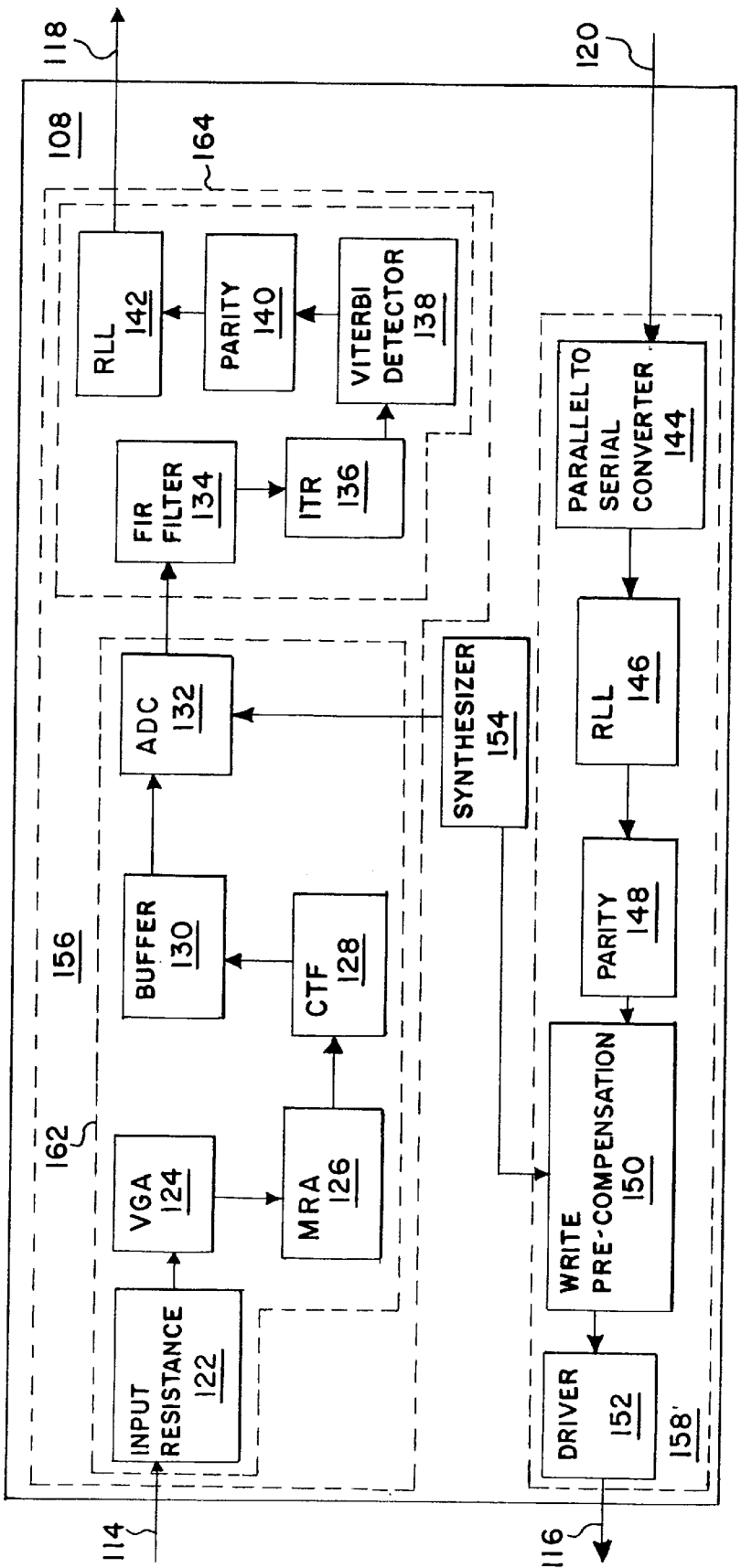
FIG.1A
FIG.1B

EFFICIENT ANALOG FRONT END FOR A READ/WRITE CHANNEL OF A HARD DISK DRIVE RUNNING FROM A HIGHLY REGULATED POWER SUPPLY

BACKGROUND

Computer hard disk drives, also known as fixed disk drives or hard drives, have become a de facto standard data storage component of modem computer systems and are making further inroads into modem consumer electronics as well. Their proliferation can be directly attributed to their low cost, high storage capacity and high reliability, in addition to wide availability, low power consumption, high data transfer speeds and decreasing physical size.

These disk drives typically consist of one or more rotating magnetic platters encased within an environmentally controlled housing that further includes all of the electronics and mechanics to read and write data and interface with other devices. Read/write heads are positioned above each of the platters, and typically on each face, to record and read data. The electronics of a hard disk drive are coupled with these read/write heads and include numerous components to control the position of the heads and generate or sense the electromagnetic fields representing data. These components receive data from a host device, such as a personal computer, and translate that data into magnetic encodings written onto the disk platters by the heads. Further, when a host device requests data from the drive, the electronics locate the desired data, sense the magnetic encodings which represent that data and translate those encodings back into the binary digital information which the host device can understand. Further, error detection and correction algorithms are applied to ensure accurate storage and retrieval of data.

One area in which significant advancements have been made has been in the area of read/write head technology and the methods of interpreting the magnetic fluctuations sensed by these heads. The read/write head, of which a typical hard disk has several, is the interface between magnetic platters and the disk drive electronics. The read/write head actually reads and writes the magnetically encoded data as areas of magnetic flux on the platters. Data, consisting of binary 1's and 0's, are encoded by sequences of the presence or absence of flux reversals recorded or detected by the read/write head. A flux reversal is a change in the magnetic flux in two contiguous areas of the disk platter. Traditional hard drives read data off the platters by detecting the voltage peak imparted in the read/write head when a flux reversal passes underneath the read/write head as the platters rotate. This is known as "peak detection." However, increasing storage densities require reduced peak amplitudes and better signal discrimination and higher platter rotational speeds are pushing the peaks closer together thus making peak detection more difficult to accomplish.

Magneto-resistive ("MR") read/write heads have been developed with increased sensitivity to sense smaller amplitude magnetic signals and with increased signal discrimination to address some of the problems with increasing storage densities. In addition, another technology, known as Partial Response Maximum Likelihood ("PRML"), has been developed to further address the problems with peak detection as densities and rotational speeds increase. Borrowed from communications technology, PRML is an algorithm implemented in the disk drive electronics to interpret the magnetic signals sensed by the read/write heads. PRML-based disk drives read the analog waveforms generated by the magnetic flux reversals stored on the disk. However, instead of looking for peak values to indicate flux reversals, PRML-based drives digitally sample this analog waveform (the "Partial Response") and use advanced signal processing technologies to determine the bit pattern represented by that wave form (the "Maximum Likelihood"). This technology, in conjunction magneto-resistive ("MR") heads, have permitted manufacturers to further increase data storage densities. PRML technology further tolerates more noise in the sensed magnetic signals permitting the use of lower quality platters and read/write heads which increases manufacturing yields and lowers costs.

The read/write heads of the hard disk drive are coupled with a device called a read/write channel. Herein, the phrase "coupled with" is defined to mean directly connected to or indirectly connected with through one or more intermediate components. Such intermediate components may include both hardware and software based components. The read/write channel converts binary/digital data from the host device into the electrical impulses which drive the read/write head to magnetically record the data to the disk drive platters. Further, the read/write channel receives the analog waveform magnetically sensed by the read/write heads and converts that waveform back into the binary/digital data stored on the drive.

With many different drives available from multiple manufacturers, hard disk drives are typically differentiated by factors such as cost/megabyte of storage, data transfer rate, power requirements and form factor (physical dimensions) with the bulk of competition based on cost. With most competition between hard disk drive manufacturers coming in the area of cost, there is a need for enhanced hard disk drive components which prove cost effective in increasing supplies and driving down manufacturing costs all while increasing storage capacity, operating speed, reliability and power efficiency.

One area in which power efficiency can be increased is with the read/write channel of the hard drive. The read/write channel of the hard drive typically includes an analog portion, which is used to convert digital signals received from a controller to analog signals which then get sent to the read/write heads. The analog portion may also be used to receive analog signals from the read/write heads and convert them into digital signals.

Typically, the analog portion of the read/write channel 108 is manufactured using one of two methods. The first method is to use only high voltage transistors which all operate within the same voltage range. However, high voltage transistors require a lot of power, are relatively slow, and do not scale so well with a CMOS manufacturing process. The second method is to use both high voltage transistors and low voltage transistors and use a power supply voltage, which is substantially higher than the maximum rating for the low voltage transistors. Low voltage transistors operate at a higher speed, occupy less silicon area, and consume less power than high voltage transistors. Typically, low voltage transistors are used in a core area of a circuit and high voltage transistors are used in an I/O area of the circuit. However, since the high voltage transistors operate at a higher voltage range than the low voltage transistors, verification and simulations must be performed on the analog portion to insure that the low voltage transistors never receive more voltage than is required for them to operate. For example, the analog portion may include high voltage transistors that operate at a voltage range of between 2.16 volts and 2.64 volts (2.4 volts +/−10%), and low voltage transistors that operate at a lower voltage range, such as between 1.62 volts and 1.98 volts (1.8 volts +/−10%). In this example, since the analog portion is typically supplied a voltage that is within a single range, such as a voltage of 2.4 volts +/−10%, verification and simulations must be performed on the analog portion to insure that the low voltage transistors never receive more voltage than is required for them to operate. Moreover, additional circuitry is placed inside the analog portion to further insure that the low voltage transistors never receive more voltage than is required for them to operate. The additional circuitry, and the verification and the simulations that must be performed on the analog portion, in turn, increase the time required to design the read/write channel.

Thus, there is a need for a read/write channel which is able to operate in a single, low voltage range and accommodate a variety of transistors in order to prevent the use of additional circuitry, to eliminate additional verification and simulations performed on the analog portion, to lower the power consumption of the read/write channel, and to lower the required silicon area.

SUMMARY

The present invention is defined by the following claims, and nothing in this section should be taken as a limitation on those claims. By way of introduction, the preferred embodiments described below relate to a read/write channel for a hard disk drive. The read/write channel includes an analog portion and a clock synthesizer. The analog portion and the clock synthesizer both comprise high voltage transistors which operate in a first voltage range and low voltage transistors which operate in a second voltage range. The first voltage range is within the second voltage range. The read/write channel also includes a highly regulated power supply connected to the analog portion and the clock synthesizer. The highly regulated power supply supplies power that is within the first voltage range to the analog portion and the clock synthesizer.

The preferred embodiments further relate to a method for operating a read/write channel for a hard disk drive. The method includes providing an analog portion and a clock synthesizer of the read/write channel, wherein the analog portion and the clock synthesizer both comprise high voltage transistors which operate in a first voltage range and low voltage transistors which operate in a second voltage range. The method further includes insuring that the first voltage range is within the second voltage range. Also, the method includes generating power that is within the first voltage range using a highly regulated power supply and supplying the power to the analog portion and the clock synthesizer. Further aspects and advantages of the invention are discussed below in conjunction with the preferred embodiments.

BRIEF DESCRIPTION OF THE DRAWINGS

FIG. 1A depicts a block diagram of an exemplary hard disk drive coupled with a host device.

FIG. 1B depicts a block diagram of a read/write channel for use with the disk drive of FIG. 1A.

DETAILED DESCRIPTION OF THE PRESENTLY PREFERRED EMBODIMENTS

Figure 2:
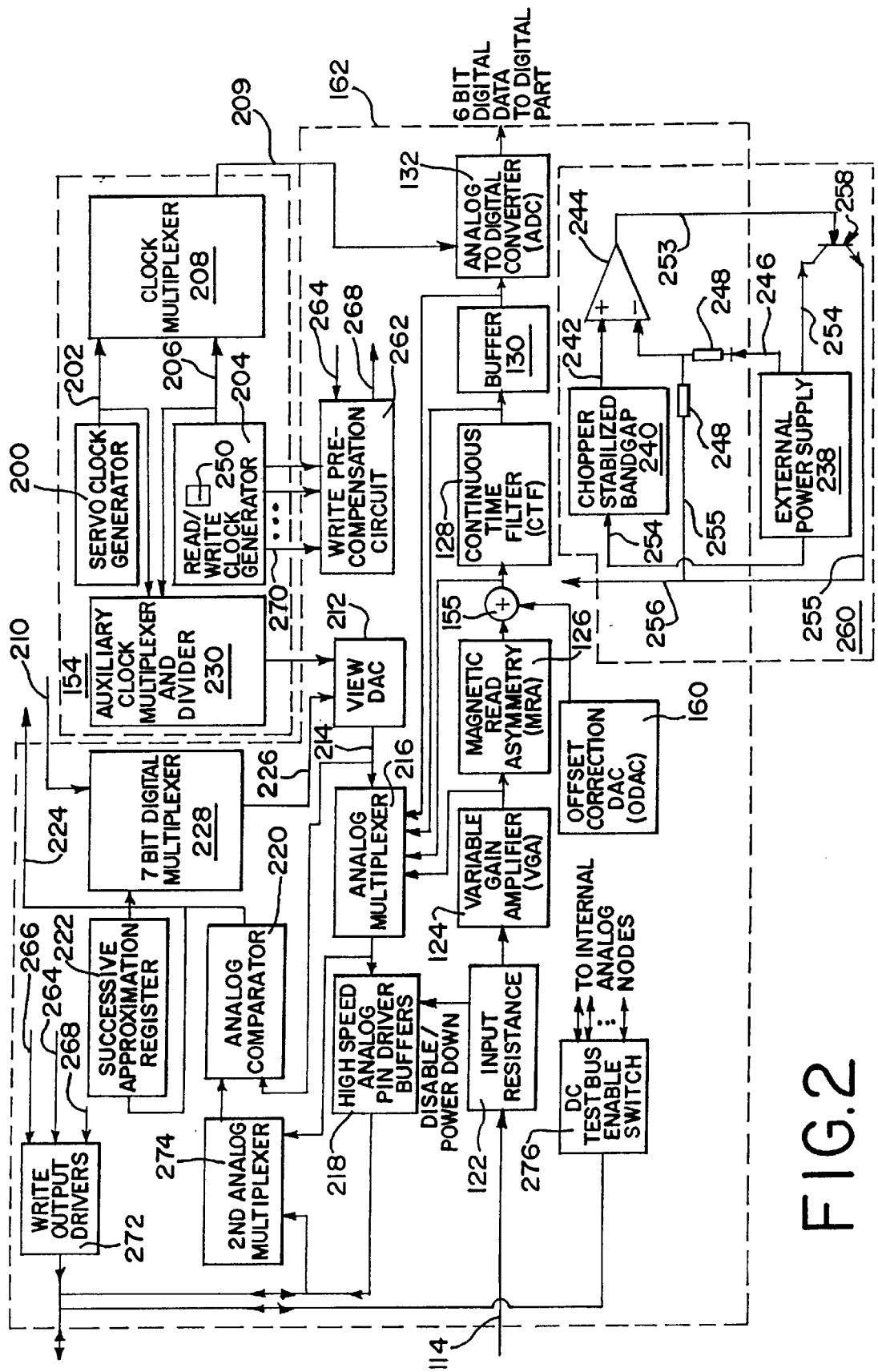
FIG. 2 depicts a block diagram of a portion of a read path of a read/write channel, according to one preferred embodiment.

The embodiments described herein relate to a PRML-based read/write channel device for hard disk drive controllers. The read/write channel is a device coupled with the read/write heads of the hard disk drive. Herein, the phrase "coupled with" is defined to mean directly connected to or indirectly connected with through one or more intermediate components. Such intermediate components may include both hardware and software based components. The read/write channel converts binary/digital data from the host device into the electrical impulses which drive the read/write head to magnetically record the data to the disk drive platters. Further, the read/write channel receives the analog waveform magnetically sensed by the read/write heads and converts that waveform back into the binary/digital data stored on the drive.

Referring to FIG. 1A, there is shown a block diagram of an exemplary hard disk drive 100 coupled with a host device 112. For clarity, some components, such as the servo/actuator motor control, are not shown. The drive 100 includes the magnetic platters and spindle motor 102, the read/write heads and actuator assembly 104, pre-amplifiers 106, a read/write channel 108 and a controller 110. The pre-amplifiers 106 are coupled with the read/write channel 108 via interfaces 114, 116. The controller 110 interfaces with the read/write channel 108 via interfaces 118, 120.

For reads from the hard disk 100, the host device 112 provides a location identifier which identifies the location of the data on the disk drive, e.g. a cylinder and sector address. The controller 110 receives this address and determines the physical location of the data on the platters 102. The controller 110 then moves the read/write heads into the proper position for the data to spin underneath the read/write heads 104. As the data spins underneath the read/write head 104, the read/write head 104 senses the presence or absence of flux reversals, generating a stream of analog signal data. This data is passed to the pre-amplifiers 106 which amplify the signal and pass it to the read/write channel 108 via the interface 114. As will be discussed below, the read/write channel receives the amplified analog waveform from the pre-amplifiers 106 and decodes this waveform into the digital binary data that it represents. This digital binary data is then passed to the controller 110 via the interface 118. The controller 110 interfaces the hard drive 100 with the host device 112 and may contain additional functionality, such as caching or error detection/correction functionality, intended to increase the operating speed and/or reliability of the hard drive 100.

For write operations, the host device 112 provides the controller 110 with the binary digital data to be written and the location, e.g. cylinder and sector address, of where to write it. The controller 110 moves the read/write heads 104 to the proper location and sends the binary digital data to be written to the read/write channel 108 via interface 120. The read/write channel 108 receives the binary digital data, encodes it and generates analog signals which are used to drive the read/write head 104 to impart the proper magnetic flux reversals onto the magnetic platters 102 representing the binary digital data. The generated signals are passed to the pre-amplifiers 106 via interface 116 which drive the read/write heads 104.

Referring to FIG. 1B, there is shown an exemplary read/write channel 108 supporting Partial Response Maximum Likelihood ("PRML") encoding technology for use with the hard disk drive 100 of FIG. 1A. For clarity, some components have been omitted. The read/write channel 108 is implemented as an integrated circuit using a complementary metal oxide semiconductor ("CMOS") process at 0.18 micron. It will be appreciated that CMOS processes include processes which use metal gates as well as polysilicon gates.

It will further be appreciated that other process technologies and feature sizes may used and that the circuitry disclosed herein may be further integrated with other circuitry comprising the hard disk electronics such as the hard disk controller logic. As was described, the read/write channel 108 converts between binary digital information and the analog signals representing the magnetic flux on the platters 102. The read/write channel 108 is divided into two main sections, the read path 156 and the write path 158.

The write path 158 includes a parallel-to-serial converter 144, a run-length-limited ("RLL") encoder 146, a parity encoder 148, a write pre-compensation circuit 150 and a driver circuit 152. The parallel-to-serial converter 144 receives data from the host device 112 via interface 120 eight bits at a time. The converter 144 serializes the input data and sends the serial bit stream to the RLL encoder 146. The RLL encoder 146 encodes the serial bit stream into symbolic binary sequences according to a known run-length limited algorithm for recording on the platters 102. The exemplary RLL encoder uses a 32/34 bit symbol code to ensure that flux reversals are properly spaced and that long runs of data without flux reversals are not recorded. The RLL encoded data is then passed to the parity encoder 148 which adds a parity bit to the data. In the exemplary parity encoder 148, odd parity is used to ensure that long run's of 0's and 1's are not recorded due to the magnetic properties of such recorded data. The parity encoded data is subsequently treated as an analog signal rather than a digital signal. The analog signal is passed to a write pre-compensation circuit 150 which dynamically adjusts the pulse widths of the bit stream to account for magnetic distortions in the recording process. The adjusted analog signal is passed to a driver circuit 152 which drives the signal to the pre-amplifiers 106 via interface 116 to drive the read/write heads 104 and record the data. The exemplary driver circuit 152 includes a pseudo emitter coupled logic ("PECL") driver circuit which generates a differential output to the pre-amplifiers 106.

The read path 156 of the read/write channel 108 includes an analog portion 162 and a digital portion 164, as illustrated in FIG. 1B. The analog portion 162 of the read path 156 is the portion of the read path 156 in which the signal passing through it is primarily analog. The analog portion 162 includes an attenuation circuit/input resistance 122, a variable gain amplifier ("VGA") 124, a magneto-resistive asymmetry linearizer ("MRA") 126, a continuous time filter ("CTF") 128, a buffer 130, and an analog to digital converter ("ADC") 132. The digital portion 164 of the read path 156 is the portion of the read path 156 in which the signal passing through it is primarily digital. The digital portion 164 includes a finite impulse response ("FIR") filter 134, an interpolated timing recovery ("ITR") circuit 136, a Viterbi algorithm detector 138, a parity decoder 140 and a run-length-limited ("RLL") decoder 142.

The amplified magnetic signals sensed from the platters 102 by the read/write head 104 are received by the read/write channel 108 via interface 114. The analog signal waveform representing the sensed magnetic signals is first passed through an input resistance 122 which is a switching circuit to attenuate the signal and account for any input resistance. The attenuated signal is then passed to a VGA 124 which amplifies the signal. In one embodiment, the VGA 124 uses (1+X) and (1−X) resistor DACs in gain cells within the VGA 124 to achieve equal gain step size in the logarithmic domain, an example of which is described in greater detail in U.S. Pat. No. 6,570,447, and titled "Programmable Logarithmic Gain Adjustment for Open Loop Amplifiers", the entire disclosure of which is incorporated herein by reference. In one embodiment, the VGA 124 uses current feedback in the gain cells to achieve equal gain step size in the logarithmic domain, an example of which is described in greater detail in U.S. Pat. No. 6,580,326, and titled "High-Bandwidth Low-Voltage Gain-Cell And Voltage Follower Having An Enhanced Transconductance", the entire disclosure of which is incorporated herein by reference. Preferably, the VGA 124 includes auto zero capacitors that are not in the signal path, an example of which is described in greater detail in U.S. Pat. No. 6,6583,660, and titled "Active Auto Zero Circuit For Time Continuous Open Loop Amplifiers," the entire disclosure of which is incorporated herein by reference.

Upon passing though VGA 124, the amplified signal is then passed to the MRA 126 which adjusts the signal for any distortion created by the recording process. Essentially, the MRA 126 performs the opposite function of the write-pre-compensation circuit 150 in the write path 158. In one preferred embodiment, the output from the MRA pass to a stemming node 155. The stemming node 155 is connected with an offset correction DAC (ODAC) 160. The ODAC 160 introduces an analog offset, which is proportional to its digital input. Its digital input is controlled by a DC-restore-loop. The DC-restore-loop decides based on the output from the ADC 132 if the offset value of the ODAC 160 has to be increased or reduced. The goal of the DC-restore-loop is to remove any offset in the analog signal path. The analog signal path starts with the signal inputs of the read write channel into the VGA 124 and ends at the ADC 132. The DC-restore-loop does this by adding an offset to the analog signal at the output of the MRA 126. This offset has ideally the same absolute value as the effective offset in the analog signal path with an opposite sign. By doing so the DC-restore-loop cancels the offset of the analog signal path.

The signal is next passed through the CTF 128, which is essentially a low pass filter that filters out noise and pre equalizes the signal by boosting some part A of the signal in a pass-band. Preferably, the CTF 128 includes switching Gm cells, an example of which is described in greater detail in U.S. Pat. No. 6,480,064, and titled "Method and Apparatus For An Efficient Low Voltage Switchable Gm Cell," and in U.S. patent application Ser. No. 09/865,649, filed on May 25, 2001, assigned publication no. 2002/0175765, and titled "A Method and Apparatus for Calibrating a Gm Cell Utilizing a Replica Gm Cell," the entire disclosures of which are incorporated herein by reference. In one embodiment, the CTF 128 includes a separate read filter circuit and a separate servo filter circuit, an example of which is described in greater detail in U.S. patent application Ser. No. 09/865,861 filed on May 25, 2001, assigned publication no. 2002/0176196, and titled "Method and Apparatus For Operating a Continuous Time Filter of a Read/Write Channel For a Hard Disk Drive," the entire disclosure of which is incorporated herein by reference. The filtered signal is then passed to the ADC 132 via the buffer 130 which samples the analog signal and converts it to a digital form. Preferably, the ADC 132 includes pre-amplifiers 106 with local common mode feedback in analog latches of the ADC 132, an example of which s described in greater detail in U.S. patent application Ser. No. 09/85,856 filed on May 25, 2001, assigned publication no. 2002/0175727, and titled "Ultra High Speed Clocked Analog Latch," and in U.S. patent application Ser. No. 09/865,791, filed on May 25, 2001, assigned publication no. 2002/0175716, and titled "Ultra High Speed Clocked Limiting Preamplifier," the entire disclosures of which are incorporated herein by reference. U.S.

Pat. No. 6,519,103, and titled "View DAC Feedback Inside Analog Front Circuit," the entire disclosure of which is incorporated herein by reference.

In one preferred embodiment, the read/write clock generator 204, also referred to as "read/write clock generation," uses no divider at reference frequency inputs of phase locked loops for generating the read clock signal 206, an example of which is described in greater detail in U.S. patent application Ser. No. 09/676,277, filed Sep. 28, 2000, assigned attorney docket no. 00 P 7955 US, and titled "High Resolution, Low Jitter Frequency Synthesizer," the entire 67 disclosure of which is incorporated herein by reference. In one preferred embodiment, the servo clock generator 200, also referred to as "servo clock generation," uses no divider at reference frequency inputs of phase locked loops for generating the servo clock signal 202, an example of which is described in greater detail in U.S. patent application Ser. No. 09/676,277, filed Sep. 28, 2000, assigned attorney docket no. 00 P 7955 US, and titled "High Resolution, Low Jitter Frequency Synthesizer," the entire disclosure of which is incorporated herein by reference.

In one preferred embodiment, the read/write clock generator 204 includes read/write phased locked loops having a feedback path. The read/write clock generator 204 uses a fractional divider in the feedback path of the read/write phased locked loops to achieve low frequency programming step sizes, an example of which is described in greater detail in U.S. patent application Ser. No. 09/676,277, filed Sep. 28, 2000, assigned attorney docket no. 00 P 7955 US, and titled "High Resolution, Low Jitter Frequency Synthesizer," the entire disclosure of which is incorporated herein by reference. a VGA 124 which amplifies the signal. In one embodiment, the VGA 124 uses (1+X) and (1−X) resistor DACs in gain cells within the VGA 124 to achieve equal gain step size in the logarithmic domain, an example of which is described in greater detail in U.S. Pat. No. 6,570,447, and titled "Programmable Logarithmic Gain Adjustment for Open Loop Amplifiers", the entire disclosure of which is incorporated herein by reference. In one embodiment, the VGA 124 uses current feedback in the gain cells to achieve equal gain step size in the logarithmic domain, an example of which is described in greater detail in U.S. Pat. No. 6,580,326, and titled "High-Bandwidth Low-Voltage Gain-Cell And Voltage Follower Having An Enhanced Transconductance", the entire disclosure of which is incorporated herein by reference. Preferably, the VGA 124 includes auto zero capacitors that are not in the signal path, an example of which is described in greater detail in U.S. Pat. No. 6,6583,660, and titled "Active Auto Zero Circuit For Time Continuous Open Loop Amplifiers," the entire disclosure of which is incorporated herein by reference.

Upon passing though VGA 124, the amplified signal is then passed to the MRA 126 which adjusts the signal for any distortion created by the recording process. Essentially, the MRA 126 performs the opposite function of the write-precompensation circuit 150 in the write path 158. In one preferred embodiment, the output from the MRA pass to a stemming node 155. The stemming node 155 is connected with an offset correction DAC (ODAC) 160. The ODAC 160 introduces an analog offset, which is proportional to its digital input. Its digital input is controlled by a DC-restore-loop. The DC-restore-loop decides based on the output from the ADC 132 if the offset value of the ODAC 160 has to be increased or reduced. The goal of the DC-restore-loop is to remove any offset in the analog signal path. The analog signal path starts with the signal inputs of the read write channel into the VGA 124 and ends at the ADC 132. The DC-restore-loop does this by adding an offset to the analog signal at the output of the MRA 126. This offset has ideally the same absolute value as the effective offset in the analog signal path with an opposite sign. By doing so the DC-restore-loop cancels the offset of the analog signal path.

The signal is next passed through the CTF 128, which is essentially a low pass filter that filters out noise and pre equalizes the signal by boosting some part A of the signal in a pass-band. Preferably, the CTF 128 includes switching Gm cells, an example of which is described in greater detail in U.S. Pat. No. 6,480,064, and titled "Method and Apparatus For An Efficient Low Voltage Switchable Gm Cell," and in U.S. patent application Ser. No. 09/865,649, filed on May 25, 2001, assigned publication no. 2002/0175765, and titled "A Method and Apparatus for Calibrating a Gm Cell Utilizing a Replica Gm Cell," the entire disclosures of which are incorporated herein by reference. In one embodiment, the CTF 128 includes a separate read filter circuit and a separate servo filter circuit, an example of which is described in greater detail in U.S. patent application Ser. No. 09/865,861 filed on May 25, 2001, assigned publication no. 2002/0176196, and titled "Method and Apparatus For Operating a Continuous Time Filter of a Read/Write Channel For a Hard Disk Drive," the entire disclosure of which is incorporated herein by reference. The filtered signal is then passed to the ADC 132 via the buffer 130 which samples the analog signal and converts it to a digital form. Preferably, the ADC 132 includes pre-amplifiers 106 with local common mode feedback in analog latches of the ADC 132, an example of which s described in greater detail in U.S. patent application Ser. No. 09/85,856 filed on May 25, 2001, assigned publication no. 2002/0175727, and titled "Ultra High Speed Clocked Analog Latch," and in U.S. patent application Ser. No. 09/865,791, filed on May 25, 2001, assigned publication no. 2002/0175716, and titled "Ultra High Speed Clocked Limiting Preamplifier," the entire disclosures of which are incorporated herein by reference.

Upon passing through the ADC 132, the digital signal is then passed to a FIR filter 134 and then to a timing recovery circuit (ITR) 136. The ITR 136 is connected (not shown in the figure) to the FIR filter 134, the MRA 126 and the VGA 124 in a feedback orientation to adjust these circuits according to the signals received to provide timing compensation. The exemplary FIR filter 134 is a 10 tap FIR filter. The digital signal is then passed to the Viterbi algorithm detector 138 which determines the binary bit pattern represented by the digital signal using digital signal processing techniques. The exemplary Viterbi algorithm detector 138 uses a 32 state Viterbi processor. The binary data represented by the digital signal is then passed to the parity decoder 140 which removes the parity bit and then to the RLL decoder 142 which decodes the binary RLL encoding symbols back into the actual binary data that they represents This data is then passed to the controller 110 via the interface 118.

The read/write channel 108 further includes a clock synthesizer 154. The clock synthesizer 154 generates the clock signals required for operating the read/write channel 108. The exemplary clock synthesizer 154 includes a phased locked loop ("PLL") with a voltage controlled oscillator and various clock dividers to generate the necessary frequencies.

In one preferred embodiment, the clock synthesizer 154 includes a servo clock generator 200, a read/write clock generator 204, a clock multiplexer 208 and an auxiliary clock multiplexer and divider 230, as illustrated in FIG. 2. The servo clock generator 200 generates a servo clock signal 202 and the read/write clock generator 204 generates a read/write clock signal 206. The servo clock signal 202 and read/write clock signal 206 then go to a clock multiplexer 208 and an auxiliary clock multiplexer and divider 230. The clock multiplexer 208 allows either the servo clock signal 202 or the read/write clock signal 206 to pass through and go to the ADC 132. The auxiliary clock multiplexer and divider 230 allows either the servo clock signal 202 or the read/write clock signal 206 to pass through and go to the view DAC 212, as described below. The auxiliary clock multiplexer and divider 230 allows the view DAC 212 and the ADC 132 to run at the same time using different clock signals, an example of which is described in greater detail in U.S. Pat. No. 6,519,103, and titled "View DAC Feedback Inside Analog Front Circuit," the entire disclosure of which is incorporated herein by reference.

In one preferred embodiment, the read/write clock generator 204, also referred to as "read/write clock generation," uses no divider at reference frequency inputs of phase locked loops for generating the read clock signal 206, an example of which is described in greater detail in U.S. patent application Ser. No. 09/676,277, filed Sep. 28, 2000, assigned attorney docket no. 00 P 7955 US, and titled "High Resolution, Low Jitter Frequency Synthesizer," the entire disclosure of which is incorporated herein by reference. In one preferred embodiment, the servo clock generator 200, also referred to as "servo clock generation," uses no divider at reference frequency inputs of phase locked loops for generating the servo clock signal 202, an example of which is described in greater detail in U.S. patent application Ser. No. 09/676,277, filed Sep. 28, 2000, assigned attorney docket no. 00 P 7955 US, and titled "High Resolution, Low Jitter Frequency Synthesizer," the entire disclosure of which is incorporated herein by reference.

In one preferred embodiment, the read/write clock generator 204 includes read/write phased locked loops having a feedback path. The read/write clock generator 204 uses a fractional divider in the feedback path of the read/write phased locked loops to achieve low frequency programming step sizes, an example of which is described in greater detail in U.S. patent application Ser. No. 09/676,277, filed Sep. 28, 2000, assigned attorney docket no. 00 P 7955 US, and titled "High Resolution, Low Jitter Frequency Synthesizer," the entire disclosure of which is incorporated herein by reference.

In one embodiment, the read/write clock generator 204 uses a low voltage charge pump, an example of which is described in greater detail in U.S. Pat. No. 6,512,404, and titled "Low Voltage Charge Pump for Use In A Phase Locked Loop," the entire disclosure of which is incorporated herein by reference.

In one embodiment, the read/write clock generator 204 uses an offset canceled charge pump based phase frequency detector, an example of which is described in greater detail in U.S. patent application Ser. No. 09/865,406 filed on May 25, 2001, assigned publication no. 2002/0176188, and titled "Offset Calibration of Charge Pump Based Phase Detector for Synthesizer/PLL," the entire disclosure of which is incorporated herein by reference.

In one embodiment, the read/write clock generator 204 includes a Voltage Controlled Oscillator (VCO) 250 that is used for read/write clock generation. Preferably, the read/write clock generator 204 uses a delay unit with four transistors as a delay unit for the VCO 250, an example of which is described in greater detail in U.S. patent application Ser. No. 09/866,269,filed on May 25, 2001, assigned publication no. 2002/0175729, and titled "Differential CMOS Controlled Delay Unit," the entire disclosure of which is incorporated herein by reference. In one embodiment, the read/write clock generator 204 uses a delay unit to build a VCO 250 with only two delay stages, an example of which is described in greater detail in U.S. patent application Ser. No. 09/866,269, filed on May 25, 2001, assigned publication no. 2002/0175729, and titled "Differential CMOS Controlled Delay Unit," the entire disclosure of which is incorporated herein by reference. In one embodiment, the read/write clock generator 204 uses a fully functional VCO 250 which has only one port for receiving both the power supply voltage and the control input signal to the VCO 250, an example of which is described in greater detail in U.S. patent application Ser. No. 09/866,269, filed on May 25, 2001, assigned publication no. 2002/0175729, and titled "Differential CMOS Controlled Delay Unit," the entire disclosure of which is incorporated herein by reference. In one embodiment, the read/write clock generator 204 uses a VCO buffer that includes only one source follower and a current feedback loop, an example of which is described in greater detail in U.S. Pat. No. 6,526,613, and titled "Efficient Current Feedback Buffer", the entire disclosure of which is incorporated herein by reference.

In one embodiment, the read/write clock generator 204 includes a multiphase multiplexer that only has one or two NMOS transistors in each signal path of each phase and a pull up PMOS transistor operating as a pull up resistor, an (example of which is described in greater detail in U.S. Pat. No. 6,501,324, and titled "High Speed Multiplexer," the entire disclosure of which is incorporated herein by reference.

In one embodiment, the analog portion 162 of the read path 156 includes a write pre-compensation circuit 262, which dynamically adjusts the pulse widths of the bit stream to account for magnetic distortions in the recording process, as illustrated in FIG. 2. The synthesizer 154, and more specifically, the read/write clock generator 204 is connected with the write pre-compensation circuit 262. Additionally, the write pre-compensation circuit 262 receives write data 264 from the digital portion 164 of the read path 156 of the read/write channel 108. The write pre-compensation circuit 262 outputs write data with pre-compensation 268, which is received by write output drivers 272.

In one embodiment, the read/write clock generator 204 generates a multiphase output signal 270 using the VCO 250. The multiphase output signal 270 preferably includes at least four signals of varying phase, as illustrated in FIG. 2. The multiphase output signal 270 is then passed to and used by the write pre-compensation circuit 262. In one embodiment, the write pre-compensation circuit 262 interpolates one or two times between difference phases of the VCO 250, an example of which is described in greater detail in U.S. patent application Ser. No. 09/865,786, filed on May 25, 2001, assigned publication 2002/0175724, and titled "Method and System for Managing a Pulse Width of a Signal Pulse," the entire disclosure of which is incorporated herein by reference. In one embodiment, the write pre-compensation circuit 262 uses a write compensation technique that has a digital zero phase restart, an example of which is described in greater detail in U.S. patent application Ser. No. 09/865,787, filed on May 25, 2001, assigned publication 2002/0176299, and titled "High Speed Digital Zero Phase Restart for a Multiphase Clock," the entire disclosure of which is incorporated herein by reference.

In one preferred embodiment, the analog portion 162 of the read path 156 LA-further includes a 7 bit digital multiplexer 228, a view DAC 212, an analog 220, and a successive approximation register 222, as illustrated in FIG. 2. The 7 multiplexer 216, high speed analog pin driver buffers 218, an analog comparator digital multiplexer 228 receives 7 bit view DAC data from the digital portion of read/write channel 108 and receives a 7 bit auxiliary ADC output signal 224 the successive approximation register 222, and decides which signal should pass to the view DAC 212. The view DAC 212 received the signal from the 7 bit digital multiplexer 228 and an additional clock signal from the auxiliary clock multiplexer and divider 230 and generates a view DAC output signal 214. The view DAC output signal 214 then passes to the analog comparator 220 and the analog multiplexer 216. In addition to receiving the view DAC output signal 214, the analog multiplexer 216 receives signals from the outputs of the VGA 124, the MRA 126, the CTF 128, and the buffer 130. Upon receiving all these signals, the analog multiplexer 216 then decides which signal to output, and outputs one of these signals to the high speed analog pin driver buffers 218. The high speed analog pin driver buffers 218 also receive a disable/power down signal. Using the analog multiplexer 216 and the high speed analog pin driver buffers 218, the read/write channel is able to multiplex the view DAC output 214 and an AC test bus output to the same pins, an example of which is described in greater detail in U.S. patent application Ser. No. 09/865/611, filed on May 25, 2001, assigned publication 2002/0176189, and titled "Input/Output Multiplex System for a Read/Write Channel in a Disk Drive," the entire disclosure of which is incorporated herein by reference.

The analog comparator 220 receives the view DAC output signal 214 and compares it with the output from the high speed analog pin driver buffers 218 and generates an output signal that is passed to the successive approximation register 222. The successive approximation register 222, together with the view DAC 212 and the analog comparator 220, forms an auxiliary analog to digital converter (ADC). In particular, the successive approximation register 222 decides, based on the output of the analog comparator 220, the voltage that should be generated in the next clock cycle by the view DAC 212 for purposes of comparison with the analog voltage being input to the analog comparator 220. At the end of a conversion cycle, which is at least 6 clock cycles, the successive approximation register 222 contains the output of the analog to digital converter 132. The successive approximation register 222 then generates the 7 bit auxiliary ADC multiplexer 228, as illustrated in FIG. 2. output signal 224 that is passed to the digital portion 164 and to the 7 bit digital In one embodiment, the analog portion 162 of the read path 156 further includes a second analog multiplexer 274, write output drivers 272, and a DC test bus enable switch 276, as illustrated in FIG. 2. The second analog multiplexer 274 receives the signal output from the high speed analog pin driver buffers 218 and the signal from the analog multiplexer 216 and decides which signal should pass to the analog comparator 220. The output of the high speed analog pin driver buffers 218 is also connected with the output of the write output drivers 272, as illustrated in FIG. 2. The write output drivers 272 receive the write data with pre-compensation 268 from the write pre-compensation circuit, the write data 264 from the digital portion, and a disable/power down write driver signal 266. The output of the write output drivers 272 is connected with the output of the DC test bus enable switch 276. The DC test bus enable switch 276 is in communication with internal analog nodes, as illustrated in FIG. 2. Using the above described circuitry, the read/write channel 108 is able to multiplex write data outputs, a DC test bus input, and a DC test bus output to the same pins, an example of which is described in greater detail in U.S. patent application Ser. No. 09/865,611, filed on May 25, 2001, assigned publication no. 2002/0176189, and titled "Input/Output Multiplex System for a Read/Write Channel in a Disk Drive," the entire disclosure of which is incorporated herein by reference. Additionally, using the above described circuitry, the read/write channel 108 is able to reuse the view DAC 212 to build an auxiliary analog to digital converter, an example of which is described in greater detail in U.S. Pat. No. 6,552,856, and titled "Diagnostic System for a Read/Write Channel in a Disk Drive," the entire disclosure of which is incorporated herein by reference.

Figure 3:
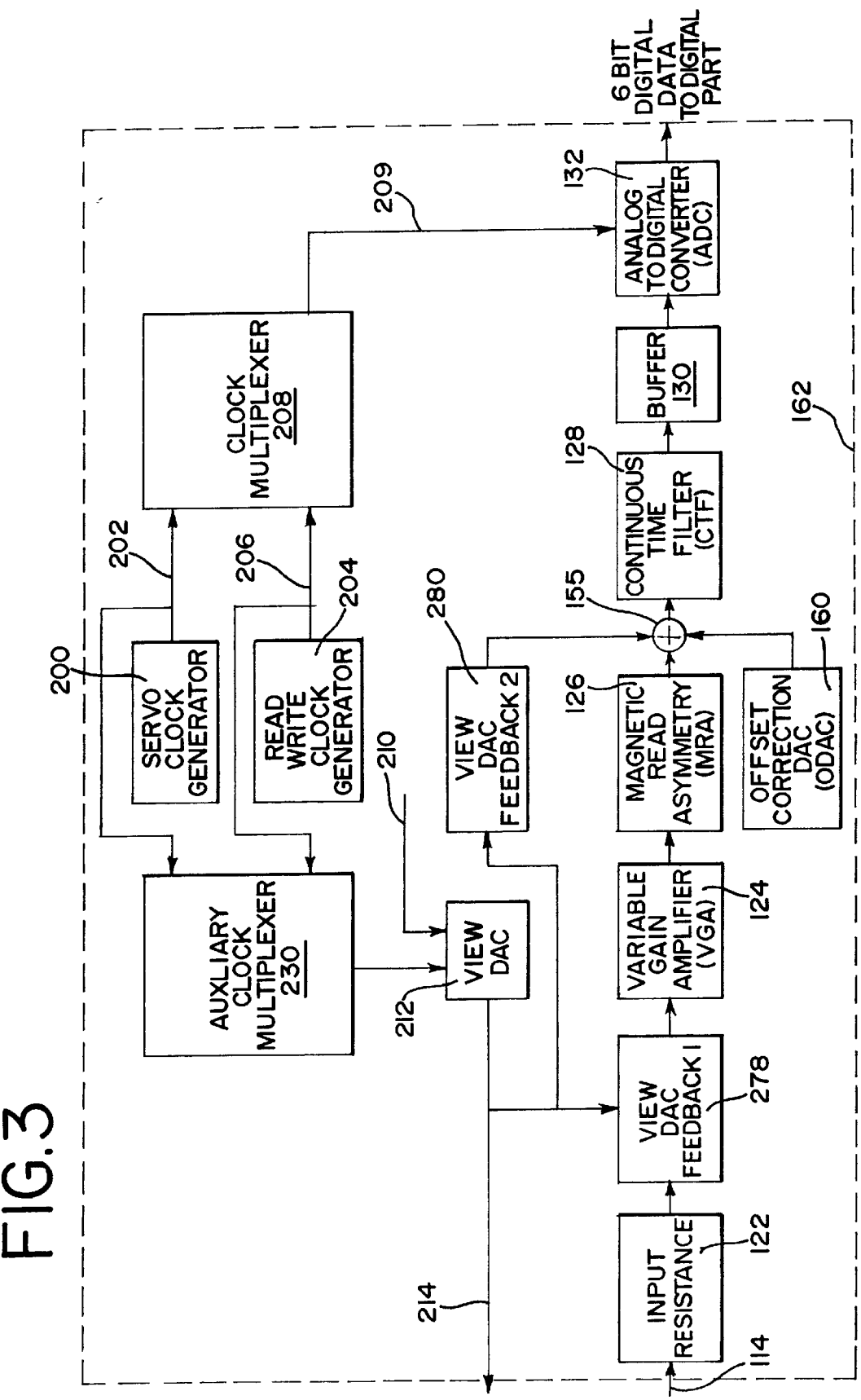
FIG. 3 depicts a block diagram of a portion of a read path of a read/write channel, according to one preferred embodiment.

In one embodiment, the analog portion 162 of the read path 156 further includes a first view DAC feedback circuit 278 and a second view DAC feedback circuit 280 which allows the view DAC output signal 214 to enter the input of the VGA 124 or the input of the CTF 128, as illustrated in FIG. 3, an example of which is described in greater detail in U.S. patent application Ser. No. 6,519,103, and titled "View DAC Feedback Inside Analog Front Circuit," the entire disclosure of which is incorporated herein by reference.

In one embodiment, the read/write channel 108, and in particular, the analog portion 162 and the clock synthesizer 154, are supplied power from a highly regulated power supply 260, as illustrated in FIG. 2. The highly regulated power supply 260 supplies power having a narrow voltage range to the read/write channel 108. As used herein a narrow voltage range is a voltage range that is within +/− 7% of the nominal voltage, and more preferably, within +/− 3% of the nominal voltage. Highly regulated power supply 260 includes a chopper stabilized bandgap 240, an integrated voltage regulator 244, a negative power supply voltage 246, resistive voltage dividers 248, an pass transistor 258, and an external power supply 238. Preferably, the chopper stabilized bandgap 240, the integrated voltage regulator 244, the negative power supply voltage 246, and the resistive voltage dividers 248 are located within the read/write channel 108 while the pass transistor 258 and the external power supply 238 are not located within the read/write channel 108, as illustrated in FIG. 2.

The external power supply 238 generates a negative high power supply voltage 246 and a positive high power supply voltage 254. In one embodiment, the negative high power supply voltage 246 and the positive high power supply voltage 254 are about 2.4 volts +/−10%. The positive high power supply voltage 254 is supplied to the chopper stabilized bandgap 240 and the negative high power supply voltage 246 passes through a resistive voltage divider 248 and is then supplied to a negative input of the integrated voltage regulator 244, as illustrated in FIG. 2. The chopper stabilized bandgap 240 generates a reference voltage 242 from the positive high power supply voltage 254. Preferably, the reference voltage 242 has a high absolute accuracy and a low temperature coefficient, so that even if the temperature of the surrounding environment changes, the reference voltage 242 stays within a narrow voltage range, that is a voltage range that is within +/−7% of the nominal voltage for the reference voltage 242, and more preferably, +/−3% of the nominal voltage for the reference voltage 242.

The reference voltage 242 is supplied to a positive input of the integrated voltage regulator 244. The integrated voltage regulator 244 receives the reference voltage 242 and the negative high power supply voltage 246, and generates an output voltage 253. The integrated voltage regulator 244 increases the value of the output voltage 253 until the value of the reference voltage 242 entering the positive input and the value of the negative high power supply voltage 246 entering the negative input, are the essentially same. The output voltage 253 enters the pass transistor 258 at a base of the pass transistor 258. Positive high power supply voltage 254 enters the pass transistor 258, as illustrated in FIG. 2. If the pass transistor 258 is a NPN-type transistor, then positive high power supply voltage 254 enters the pass transistor 258 at a collector of the pass transistor 258. If the pass transistor 258 is a PNP-type transistor, then positive high power supply voltage 254 enters the pass transistor 258 at an emitter of the pass transistor 258. An external signal 255 leaves the pass transistor 258 either at an emitter, if the pass transistor 258 is a NPN-type transistor, or at a collector, if the pass transistor 258 is a PNP-type transistor. A portion of the external signal 255 is transmitted through a resistive voltage divider 248 to the negative input of the integrated voltage divider 244, while another portion of the external signal 255 is supplied to the analog portion 162 and the clock synthesizer 154 as an internal positive low power supply voltage 256. The internal positive low power supply voltage 256 has a narrow voltage range. Preferably, the internal positive low power supply voltage 256 is less than 2.2 volts, and more preferably less than 2.0 volts. In one embodiment, the internal positive low power supply voltage 256 has a value of 1.92 volts +/−3%. While the above described pass transistor 258 is either a PNP-transistor, or a NPN transistor, the pass transistor 258 may include any transistor known to those skilled in the art, such as an MOS transistor, a NMOS transistor, or a PMOS transistor.

By incorporating any one or all of the above-described components of the read/write channel 108 into the read/write channel 108, and in particular, into the analog portion 162 and the clock synthesizer 154, and by using the highly regulated power supply 260, as illustrated in FIG. 2, it is possible to manufacture a read/write channel 108 including high voltage transistors and low voltage transistors, wherein the highly regulated power supply 260 supplies power having a single, low voltage range to the read/write channel 108. Operating the read/write channel 108 in a single, low voltage range would prevent the use of additional circuitry, would eliminate verification and simulations performed on the analog portion 162 and the clock synthesizer 154, and would lower the power consumption of the read/write channel 108. Moreover, the time required to design the read/write channel 108 would be decreased.

For example, by incorporating any one or all of the above-described components into the read/write channel 108, and in particular, into the analog portion 162 and the clock synthesizer 154, and by using the highly regulated power supply 260, it is possible to manufacture a read/write channel 108 including high voltage transistors that operate at a voltage range of between 1.86 volts and 1.98 volts (1.92 volts +/−3%) and low voltage transistors that operate at a voltage range of between 1.62 volts and 1.98 volts (1.8 volts +/−10%), wherein the highly regulated power supply 260 supplies power having a single, low voltage range of between 1.86 volts and 1.98 volts (1.92 volts +/−3%) to the read/write channel 108.

In one preferred embodiment, the low voltage transistors have a maximum voltage rating. The maximum voltage rating is the maximum voltage at which the low voltage transistors may operate at. In this embodiment, the highly regulated power supply 260 supplies power to the analog portion 162 and the clock synthesizer 154 having a nominal value between 95% and 100% of the maximum voltage rating of the low voltage transistors. So, for example, if the low voltage transistors have a maximum voltage rating of 1.98 volts, then the highly regulated power supply 260 would supply power to the analog portion 162 and the clock synthesizer 154 which is between 1.88 volts and 1.98 volts.

It is to be noted that suitable transistor sizes specifying channel width-to-length ratios (measured in micrometers or microns) for the transistors which make up the depicted circuits have been omitted from the figures. It will be appreciated that suitable ratios may be chosen depending on the design requirements and the capabilities and limitations of the particular integrated circuit fabrication process used for implementation of the circuit as well as the performance requirements of the specific embodiment.

Thus, there has been disclosed in accordance with the invention, an efficient analog front end for a read/write channel of a hard disk drive running from a highly regulated power supply that fully provides the advantages set forth above. Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications that fall within the scope of the appended claims and equivalents thereof.

We claim:

1. A read/write channel for a hard disk drive, the read/write channel connected to pre-amplifiers, the read/write channel comprising:
    an analog portion, wherein the analog portion receives an analog signal from the pre-amplifiers and converts the analog signal to a digital signal;
    a clock synthesizer, wherein the clock synthesizer generates a clock signal, and wherein the analog portion and the clock synthesizer both comprise high voltage transistors which operate in a first voltage range and low voltage transistors which operate in a second voltage range, wherein the first voltage range is within the second voltage range; and
    a highly regulated power supply connected to the analog portion and the clock synthesizer, wherein the highly regulated power supply supplies power that is within the first voltage range to the analog portion and the clock synthesizer.

2. The read/write channel of claim 1, wherein the analog portion further comprises an attenuation circuit/input resistance, a variable gain amplifier, a magneto-resistive asymmetry linearizer, a continuous time filter, a buffer, and an analog to digital converter.

3. The read/write channel of claim 2, wherein the analog portion further comprises a view DAC, a first view DAC feedback circuit and a second view DAC feedback circuit, wherein the view DAC generates a view DAC output signal which is input into either the variable gain amplifier or the continuous time filter.

4. The read/write channel of claim 1, wherein the clock synthesizer further comprises a phased locked loop with a voltage controlled oscillator and various clock dividers to generate the necessary frequencies.

5. The read/write channel of claim 4, wherein the clock synthesizer further comprises a servo clock generator, a read/write clock generator, a clock multiplexer, and an auxiliary clock multiplexer and divider.

6. The read/write channel of claim 4, wherein the read/write clock generator uses no divider at reference frequency inputs of the phase locked loops for generating a read clock signal.

7. The read/write channel of claim 4, wherein the servo clock generator uses no divider at reference frequency inputs of the phase locked loops for generating a servo clock signal.

8. The read/write channel of claim 1, wherein the analog portion further comprises a write pre-compensation circuit connected with the clock synthesizer, wherein the write pre-compensation circuit dynamically adjusts the pulse widths of a bit stream to account for magnetic distortions.

9. The read/write channel of claim 8, wherein the read/write clock generator further comprises a Voltage Controlled Oscillator (VCO) that is used for read/write clock generation, and wherein the read/write clock generator generates a multiphase output signal using the VCO.

10. The read/write channel of claim 9, wherein the multiphase output signal includes at least four signals of varying phase.

11. The read/write channel of claim 1, wherein the analog portion further comprises a 7 bit digital multiplexer, a view DAC, an analog multiplexer, high speed analog pin driver buffers, an analog comparator, and a successive approximation register.

12. The read/write channel of claim 11, wherein the analog portion further comprises a second analog multiplexer, write output drivers, and a DC test bus enable switch.

13. A read/write channel for a hard disk drive comprising:
    an analog portion;
    a clock synthesizer, wherein the analog portion and the clock synthesizer both comprise high voltage transistors which operate in a first voltage range and low voltage transistors which operate in a second voltage range, and wherein the first voltage range is within the second voltage range; and
    a highly regulated power supply connected to the analog portion and the clock synthesizer, wherein the highly regulated power supply supplies power that is within the first voltage range to the analog portion and the clock synthesizer.

14. The read/write channel of claim 13, wherein the first voltage range is between 1.86 volts and 1.98 volts and the second voltage range is between 1.62 volts and 1.98 volts.

15. The read/write channel of claim 14, wherein the highly regulated power supply supplies power that is between 1.86 volts and 1.98 volts, and wherein the analog portion and the clock synthesizer are manufactured using a 0.18 micron CMOS process.

16. The read/write channel of claim 14, wherein the highly regulated power supply supplies power that is between 1.5 volts and 1.6 volts, and wherein the analog portion and the clock synthesizer are manufactured using a 0.13 micron CMOS process.

17. The read/write channel of claim 14, wherein the highly regulated power supply supplies power that is between 1.13 volts and 1.2 volts, and wherein the analog portion and the clock synthesizer are manufactured using a 0.10 micron CMOS process.

18. The read/write channel of claim 13, wherein the highly regulated power supply supplies power having a narrow voltage range that does not vary more than +/−4% from a nominal voltage.

19. The read/write channel of claim 13, wherein the low voltage transistors have a maximum voltage rating, and wherein highly regulated power supply supplies power having a nominal having a nominal value between 95% and 100% of the maximum voltage rating of the low voltage transistors.

20. The read/write channel of claim 13, wherein the highly regulated power supply comprises a chopper stabilized bandgap, an integrated voltage regulator, a negative power supply voltage, a resistive voltage divider, a pass transistor, and an external power supply.

21. The read/write channel of claim 13, wherein the pass transistor is not located within the analog portion of the read/write channel.

22. A method for operating a read/write channel for a hard disk drive, the method comprising:
    providing an analog portion and a clock synthesizer of the read/write channel, wherein the analog portion and the clock synthesizer both comprise high voltage transistors which operate in a first voltage range and low voltage transistors which operate in a second voltage range;
    insuring that the first voltage range is within the second voltage range;
    generating power that is within the first voltage range using a highly regulated power supply;
    supplying the power to the analog portion and the clock synthesizer.

23. The method of claim 22, wherein the power has a narrow voltage range that does not vary more than +/−7% from a nominal voltage generated by the highly regulated power supply.

24. The method of claim 22, wherein the highly regulated power supply comprises a chopper stabilized bandgap, an integrated voltage regulator, a negative power supply voltage, a resistive voltage divider, a pass transistor, and an external power supply.

* * * * *